(12) United States Patent
Bennett et al.

(10) Patent No.: US 6,797,251 B1
(45) Date of Patent: Sep. 28, 2004

(54) METHOD OF MAKING CARBON FOAM AT LOW PRESSURE

(75) Inventors: Barbara Bennett, Alderson, WV (US); Alfred Stiller, Morgantown, WV (US)

(73) Assignee: West Virginia University, Morgantown, WV (US)

( * ) Notice: Subject to any disclaimer, the term of this patent is extended or adjusted under 35 U.S.C. 154(b) by 254 days.

(21) Appl. No.: 10/004,781

(22) Filed: Dec. 4, 2001

Related U.S. Application Data

(60) Provisional application No. 60/255,377, filed on Dec. 13, 2000.

(51) Int. Cl.$^7$ ............................................... C01B 31/02
(52) U.S. Cl. ................................. 423/445 R; 264/29.7
(58) Field of Search ......................... 423/447.4, 445 R; 264/29.7

(56) References Cited

U.S. PATENT DOCUMENTS

| | | | |
|---|---|---|---|
| 3,917,806 A | * 11/1975 | Anagi et al. ............ | 423/445 R |
| 4,025,689 A | 5/1977 | Kobayashi et al. | |
| 4,029,749 A | 6/1977 | Murakami | |
| 4,096,097 A | 6/1978 | Yan | |
| 4,225,463 A | 9/1980 | Unger et al. | |
| 4,272,256 A | 6/1981 | Mitsak | |
| 4,272,349 A | 6/1981 | Furutani et al. | |
| 4,272,356 A | 6/1981 | Stiller et al. | |
| 4,289,604 A | 9/1981 | Kolling et al. | |
| 4,318,824 A | 3/1982 | Turner | |
| 4,487,687 A | 12/1984 | Simo et al. | |
| 4,518,483 A | 5/1985 | Dickakian | |
| 5,705,139 A | 1/1998 | Stiller et al. | |
| 5,888,469 A | 3/1999 | Stiller et al. | |
| 6,183,854 B1 | 2/2001 | Stiller et al. | |
| 6,241,957 B1 | 6/2001 | Stiller et al. | |
| 6,346,226 B1 | 2/2002 | Stiller et al. | |

OTHER PUBLICATIONS

Hager et al., "Idealized Ligament Formation and Geometry in Open–Celled Foams", 21$^{st}$ Biennial Conference on Carbon, Conf. Proceedings, American Carbon Society, Buffalo, New York (1993), pp. 102–103 (1993).

"Reticulated Vitreous Carbon (An Exciting New Material)", Energy Research and Generation, Inc., pp. 1–4, Oakland, California.

Wang, "Reticulated Vitreous Carbon—A New Versatile Electrode Material", Electrochimica Acta, vol. 26, No. 12, pp. 1721–1726 (1981).

Donnet et al., "Carbon Fiber Applications" Carbon Fibers, Marcel Decker (1984), pp. 222–261.

Edie et al., "Melt Spinning Pitch–Based Carbon Fibers", vol. 27, No. 5, pp. 647–655, Pergamon Press (1989).

Pekala et al., "Carbon Aerogels and Xerogels", Mat. Res. Soc. Symp. Proc. (1992), pp. 3–14, vol. 270.

Mehta et al., "Graphitic Carbon Foams: Processing and Characterization", 21$^{st}$ Biennial Conference on Carbon, Conf. Proceedings, American Carbon Society, Buffalo, New York (1993), pp. 104–105.

Hall, et al., "Graphitic Foams as Potential Structural Materials", 21$^{st}$ Biennial Conference on Carbon, Conf. Proceedings, American Carbon Society, Buffalo, New York (1993), pp. 100–101.

Stiller, et al., "Effects of Additives on the Mechanical Properties of Graphitizable Foams", Proceedings from the 22$^{nd}$ Annual Conference on Ceramic, Metal and Carbon Composites, Materials and Structures, AMPTIAC, (Jan. 1988), pp. 1–10.

* cited by examiner

*Primary Examiner*—Stuart Hendrickson
(74) *Attorney, Agent, or Firm*—Arnold B. Silverman; Eckert Seamans Cherin & Mellott, LLC

(57) ABSTRACT

Methods of treating a carbon foam precursor to facilitate subsequent foaming of the material at low pressures, which may be on the order of about 0.5 to 1.5 atmospheres, are disclosed. In one embodiment, the carbon foam precursor is subjected to partial devolatilization under controlled conditions with subsequent foaming being effected at low pressure. The carbon foam precursor may be one of various forms of coal including raw coal, coal extract mesophase pitch, synthetic mesophase pitch or petroleum based pitch. The prefoaming treatment of the carbon foam precursor may remove a portion of the internal blowing agent and may alter the fluidity of the carbon foam precursor matrix. In another embodiment, the precursor after being converted into a powder is subjected to oxidation prior to foaming.

33 Claims, 2 Drawing Sheets

METHOD OF MAKING CARBON FOAM AT LOW PRESSURE

CROSS REFERENCE TO RELATED APPLICATION

This application claims the benefit of U.S. Provisional Application Ser. No. 60/255,377, filed Dec. 13, 2000.

BACKGROUND OF THE INVENTION

1. Field of the Invention

The present invention relates to a method of making an improved carbon foam material and particularly such a method which involves treatment of a carbon foam precursor followed by a low pressure foaming.

2. Description of the Prior Art

It has been known for many decades that coal can be beneficiated for application in a wide variety of environments. For example, it has been known that coal may be employed as a fuel in electric utility plants and, in respect of such usages, beneficiating of the coal will reduce the ash content and the amount of sulfur and nitrogen species contained in the gaseous exhaust products.

It has also been known to convert coal into coke for use in various process metallurgy environments.

It has also been known to create carbon foam materials from feedstocks other than coal, which can be glassy or vitreous in nature, and are brittle and not very strong. These products which lack compressive strength tend to be very brittle and are not graphitizable. See, generally, Wang, "Reticulated Vitreous Carbon A New Versatile Electrode Material," Electrochimnica Acta, Vol. 26, No. 12, pp. 1721–1726 (1981) and "Reticulated Vitreous Carbon An Exciting New Material," Undated Literature of ERG Energy Research and Generation, Inc. of Oakland, Calif.

It has been known through the analysis of mechanical properties of carbon fibers that long-range crystallite orientation is achieved by alignment of the precursor molecules during fiber spinning. In "Idealized Ligament Formation in Geometry in Open-Cell Foams" by Hager et al., 21st Biennial Conference on Carbon, Conf. Proceedings, American Carbon Society, Buffalo, N.Y., pp. 102–103 (1993), a model analysis regarding interconnected ligament networks to create geometric evaluation of hypothetical ligamentous graphitic foam is disclosed. This model analysis, however, does not indicate that graphite foam was made or how to make the same.

It has been suggested to convert synthetic naphthalenic mesophase pitch into a carbon foam product by employing a blowing/foaming agent to create bubbles in the material, followed by graphitization of the resultant carbonized foams above 2300° C. See "Graphitic Carbon Foams: Processing and Characterizations" by Mehta et al., 21st Biennial Conference on Carbon, Conf. Proceedings, American Carbon Society, Buffalo, N.Y., pp. 104–105 (1993). It is noted that one of the conclusions stated in this article is that the mechanical properties of the graphitic cellular structure were quite low when compared to model predictions.

It has been known to suggest the use of graphitic ligaments in an oriented structure in modeling related to structural materials. See "Graphitic Foams as Potential Structural Materials," Hall et al., 21st Biennial Conference on Carbon, Conf. Proceedings, American Carbon Society, Buffalo, N.Y., pp. 100–101 (1993). Graphitic anisotropic foams, when evaluated mathematically in terms of bending and buckling properties, were said to have superior properties when compared with other materials in terms of weight with particular emphasis on plate structures. No discussion of compressive properties is provided.

In "Carbon Aerogels and Xerogels" by Pekala et al., Mat. Res. Soc. Symp. Proc., Vol. 270, pp. 3–14 (1992), there are disclosed a number of methods of generating low-density carbon foams. Particular attention is directed toward producing carbon foams which have both low-density (less than 0.1 g/cc) and small cell size (less than 25 microns). This document focuses upon Sol-gel polymerization which produces organic-based Aerogels that can be pyrolyzed into carbon Aerogels.

In "Carbon Fiber Applications," by Donnet et al., "Carbon Fibers," Marcel Decker, Inc., pp. 222–261 (1984), mechanical and other physical properties of carbon fibers were evaluated. The benefits and detriments of anisotropic carbon fibers are discussed. On the negative side are the brittleness, low-impact resistance and low-break extension, as well as a very small coefficient of linear expansion. This publication also discloses the use of carbon fibers in fabric form in order to provide the desired properties in more than one direction. The use of carbon fibers in various matrix materials is also discussed. A wide variety of end use environments, including aerospace, automotive, road and marine transport, sporting goods, aircraft brakes, as well as use in the chemical and nuclear industries and medical uses, such as in prostheses, are disclosed.

It has been known to make carbon fibers by a spinning process at elevated temperatures using precursor materials which may be polyacrylonitrile or mesophase pitch. This mesophase pitch is said to be achieved through conversion of coal tar or petroleum pitch feedstock into the mesophase state through thermal treatment. This thermal treatment is followed by extrusion in a melt spinning process to form a fiber. The oriented fiber is then thermoset and carbonized. To make a usable product from the resulting fibers, they must be woven into a network, impregnated, coked and graphitized. This involves a multi-step, costly process. See "Melt Spinning Pitch-Based Carbon Fibers" by Edie et al., Carbon, Vol. 27, No. 5, pp. 647–655, Pergamen Press (1989).

U.S. Pat. No. 5,705,139 discloses a method of employing the solvent extraction process of U.S. Pat. No. 4,272,349 as a basis for selecting a particular coal extract of bituminous coal to produce isotropic coke and graphite from solid extracts obtained by non-destructive solvent treatment of coal. These materials are all solid. The patent also acknowledges the existence of petroleum pitch which is said to have certain prior uses in respect of a binder pitch, as well as possible use as a raw material for graphite or other carbon articles, but is said to suffer the same disadvantages as petroleum coke.

U.S. Pat. No. 4,025,689 discloses the use of a carbonaceous substance which may be petroleum coke, pitch coke, graphite, coal, charcoal or carbon black in making a graphitized hollow sphere wherein a foamed polystyrene coated with a carbonaceous powder and binder are heated to volatilize the core in making the porous article.

U.S. Pat. No. 4,289,604 discloses a method for manufacturing isotropic coke from a tar or tar pitch.

U.S. Pat. No. 5,888,469 discloses methods of making either anisotropic carbon foam material or isotropic carbon foam material employing coal as a starting material with processing in one embodiment including hydrogenating the coal followed by de-ashing, separation of asphaltenes, coking and graphitizing and in another following a similar process, but not involving hydrogenating the coal.

There remains, therefore, a very real and substantial need for an improved method of making a carbon foam product which involves specific treatment of a carbon foam precursor so as to facilitate creating a foam material with low pressure processing.

SUMMARY OF THE INVENTION

The present invention has met the above-described needs.

In one embodiment, the method involves providing a carbon foam precursor which may be raw bituminous coal, other coal extracts, mesophase pitches, synthetic mesophase pitches, or petroleum based pitches. The carbon foam precursor in one embodiment is heated to remove a portion of the volatiles and create a devolatilized coal extract. This is heated in an inert gas environment with either the inert gas flowing therethrough to remove the volatiles that are freed from the material or under a stagnant inert gas mass. The material is subsequently cooled and converted to a powder which is introduced in a vessel and in an inert gas environment is subjected to foaming at a low pressure which preferably is on the order of about less than 1.5 atmospheres and, preferably, about 0.5 to 1.5 atmospheres. The foamed material is subsequently cooled.

In another embodiment of the invention, a carbon foam precursor is converted into a powder and is subjected to oxidation. It is then subjected to foaming in a suitable mold and suitable vessel containing an inert gas at a pressure of less than about 20 atmospheres and, preferably, about 0.5 to 1.5 atmospheres.

If desired, with either embodiment, the treated carbon foam precursor may be stored in an inert environment prior to foaming.

It is an object of the present invention to provide methods of creating carbon foam at low pressure.

It is another object of the present invention to provide such methods wherein a pretreatment of a carbon foam precursor alters the physical characteristics of the precursor thereby facilitating low pressure foaming.

It is a further object of the present invention to provide such methods which may be employed to create a foam carbon material at a low pressure while yielding desired physical properties of the resultant foam.

It is another object of the present invention to provide such process which may be employed to convert raw bituminous coal into a carbon foam at low pressures.

These and other objects of the invention will be more fully understood from the following detailed description of the invention on reference to the illustrations appended hereto.

DESCRIPTION OF THE PREFERRED EMBODIMENTS

As employed herein, the term "carbon foam precursor" means a carbon based material which after the treatment may be foamed under the influence of heat and low pressure and shall expressly include, but not be limited to, raw coal, coal extract, de-ashed coal extract, un-ashed coal extract, hydrogenated coal extract, de-ashed hydrogenated coal extract, mesophase pitch, including synthetic mesophase pitch, and petroleum based pitch.

Figure 1:
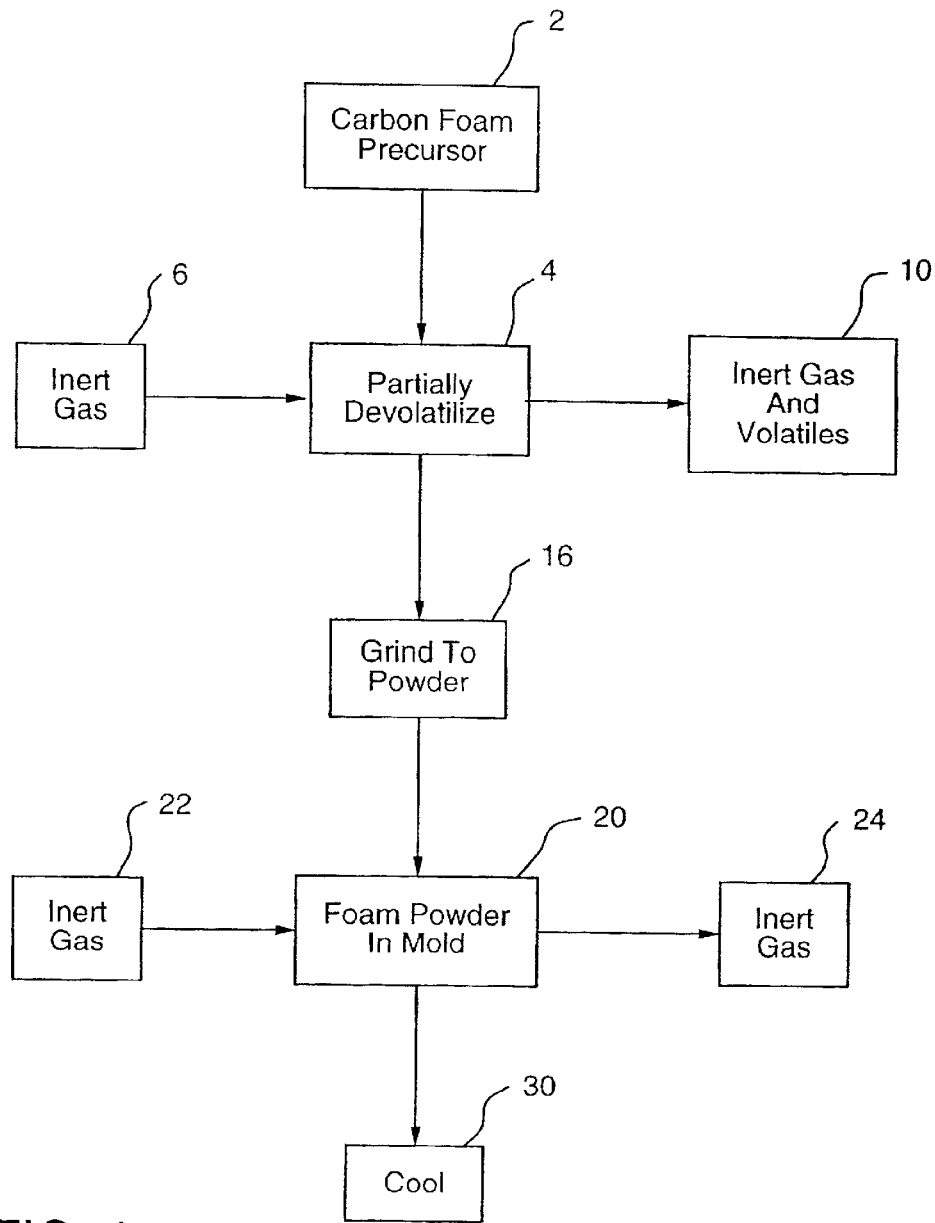
FIG. 1 is a schematic illustration of one embodiment of the method of the present invention.

Referring in greater detail to FIG. 1, a first embodiment of the process of the present invention will be considered.

As shown in FIG. 1, a carbon foam precursor 2, which for purposes of example, may be considered to be raw bituminous coal is partially devolatilized 4 at an elevated temperature which may be on the order of about 100° C. to 720° C. and, preferably, about 150° C. to 500° C. for about 1 minute to 12 hours. This is preferably accomplished in a steel vessel which is sealed and has an inert gas 6, such as nitrogen, argon or helium blanketing the system and flowing therethrough so as to carry the volatilized material out of the vessel 10 to a retort or hood exhaust. If desired, while not preferred, the inert gas can be a blanket which does not flow. All that is desired is that the system be purged of oxygen prior to devolatilization or foaming with either stagnant inert gas or inert gas flow 22, 24. This devolatizing pretreatment of the carbon foam precursor serves to remove sufficient quantities of the internal blowing agent and to change the fluid nature of the matrix or viscosity thereof so as to facilitate the subsequent ability to foam the material in creating the desired physical and mechanical properties of the ultimate foam while foaming at a low pressure. Subsequent to the partial devolatilization for the material is reduced to powder form 16 as by grinding, preferably, to create a powder in the range of about 10 to 325 mesh and, preferably, about 60 to 200 mesh. This powder may then be stored, if desired, in an inert atmosphere until such time as it is desired to foam the material.

The powder, when it is to be foamed, may be placed in mold forms and then introduced into a thick walled sealed vessel wherein foaming 20 is effected at an elevated temperature and a pressure preferably less than about 20 atmospheres and most preferably in the range of about 0.5 to 1.5 atmospheres. This may be accomplished at a temperature of about 380° C. to 600° C. under an inert gas atmosphere, such as nitrogen, either flowing through the foaming vessel 20 and emerging at 24 or stagnant. The system is heated to achieve the desired foaming temperature, preferably at the rate of about 0.01° C. to 60° C./min with a practical rate of 2° C./min. The system is maintained at the foaming temperature for about 1 minute to 6 hours and then is permitted to cool 30 to room temperature. The foam may then be removed.

Figure 2:
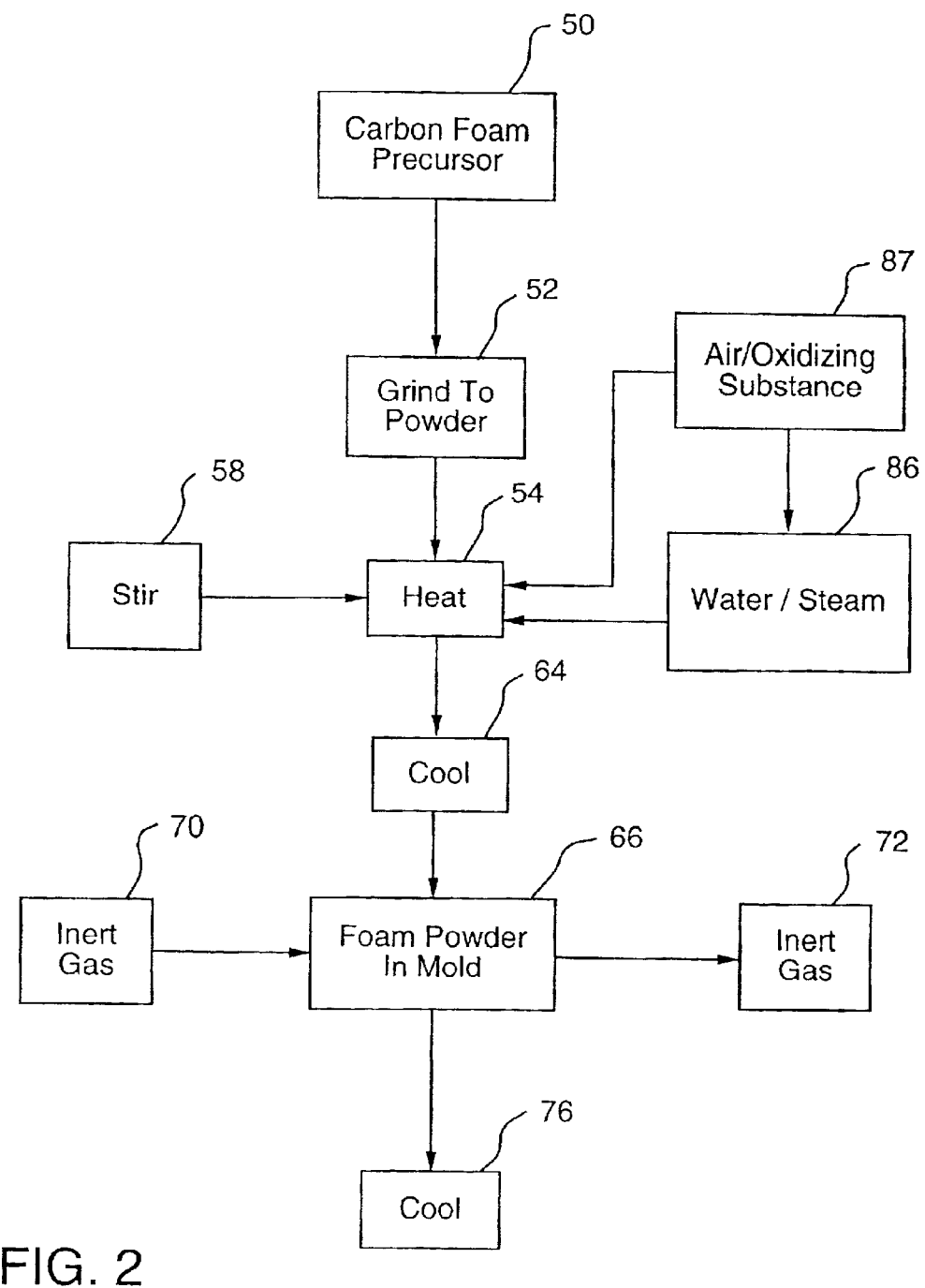
FIG. 2 illustrates schematically a second embodiment of a method of the present invention.

Referring to FIG. 2, a second embodiment of the invention will be considered. In this embodiment, a carbon foam precursor 50 is reduced to powder form as by grinding 52. The powder preferably has a size of about 10 to 35 mesh. The powder is then introduced into an oven 54 to heat the same at generally atmospheric pressure with the oven preferably being exposed to the air (or an oxygen gas/mixture). Heating may take place at about 20° C. to 500° C. and, preferably, about 100° C. to 255° C. for about 1 minute to 72 hours at a pressure of less than 20 atmospheres and, preferably, less than about 1.5 atmospheres in order to effect oxidation thereof. Oxidation occurs more rapidly at the higher times and temperatures. The oxidation serves to stabilize the matrix fluid. Preferably, the materials are stirred periodically to ensure uniform stabilization. Stirring, for example, may occur about every 10 to 20 minutes. The powder is then permitted to cool to room temperature after which it may be stored in an inert atmosphere prior to foaming. The powder is then placed in molds which, in turn, are placed in a sealed reaction vessel 66 for foaming at a temperature of about 330° C. to 600° C. for a period of about 1 minute to 6 hours. An inert gas 70, such as nitrogen, may flow over the powder in the sealed foaming vessel and emerges therefrom at 72. The material is then cooled 76 or allowed to cool to about room temperature after which they may be removed from the vessel. If desired, the oxidation and foaming may be effected in the same vessel with an intermediate flush or purge with an inert gas to remove unabsorbed oxygen.

If desired, water or steam may be introduced into the environment wherein the precursor is heated at 54 as shown by the rectangle 86. This admixture of water or steam facilitates efficient oxidation at the particle surface. A source of air or oxidizing substance 87 may be connected directly to the heating vessel 54 or may be connected to the source 86 of water/steam and then be introduced into heating vessel 54.

If desired for carbon foam precursor materials which have less reactive matrix material, such as mesophase pitches, one may partially devolatilize the material initially as described in connection with the FIG. 1 embodiment and subsequently perform the process of FIG. 2 thereon in order to oxidize the same followed by the low pressure creation of the foam.

In order to provide additional disclosure regarding the invention, an example will be provided. In this example, the precursor is devolatilized followed by foaming.

EXAMPLE 1

Three vessels, each containing one-half cup of the NMP (N-methyl pyrrolidone) extracted bituminous coal were in the reactor in a reactor which was sealed and purged with nitrogen gas. The samples were heated to 385° C. at a rate of 2° C./min. and retained at that temperature for 2 hours under a constant nitrogen purge. The samples were allowed to cool to room temperature. These samples exhibited an approximate 20% increase in volume and were porous indicating slight devolatilization. A very strong, dense carbon foam resulted. A second batch of samples of the same extract material was heated to 400° C. with all of the other conditions of the first batch being the same. This resulted in a foam that was very friable and low density. The volumetric expansion was around 1.5 to 2 times the original volume (indicating significantly more devolatilization at 400° C. than at 385° C.) These samples were ground into a fine powder separately employing a mortar and pestle and the cups were filled approximately one-half with powder. Samples of both the 385° C. powder and the 400° C. powder were placed in the reactor and the reactor was sealed and purged with nitrogen. The reactor was programmed to heat to 500° C. at the rate of 2° C./min. and hold at that temperature for 2 hours under stagnant nitrogen atmosphere. After cooling, the reactor gases were vented and the reactor opened. Good quality foam samples were obtained thereby indicating that sufficient volatiles were present to facilitate foaming, but that not so much as to result in large and inconsistent bubble sizes associated with the poor quality foams produced without the devolatilization step.

EXAMPLE 2

This example involves foam production by oxidation of the precursor.

The portion of a bituminous coal soluble in NMP was extracted and dried. The material was then ground to particle sizes of approximately 75 $\mu$m. The powder was spread into a thin layer in a shallow dish and placed in an oven preheated to 125° C. Samples of the material were heated/oxidized in open air for 30, 60, and 90 minutes with stirring being performed every 10 to 15 minutes. After the specified period of time had elapsed for heating/oxidation, the powder sample was removed from the oven and allowed to cool for approximately 30 minutes. The powder samples were then placed in aluminum molds. The mold was filled to no more than 1/3 of mold volume to allow for expansion. The aluminum mold(s) were placed in an autoclave reactor and the reactor sealed and placed in a kiln. A nitrogen inlet and outlet was connected to the reactor and a light nitrogen flow (approximately 10 cc/min) was established over the sample. The sample was heated to 400° C. at a rate of 2° C. per minute and held at that temperature for 2 hours under constant nitrogen purge. After the reactor had cooled to room temperature, the nitrogen flow was ceased and the reactor opened for inspection.

The foam samples produced from the extract oxidized for 30 and 60 minutes both appeared to double in volume and produce a nice foam. The sample oxidized for 90 minutes looked poor and was obviously over-oxidized (particles merely sintered).

The remaining samples were heated to 500° C. at a rate of 2° C./min and held at that temperature for 2 hours under constant nitrogen flow (to further coke the samples and ensure no further fluidization would occur). After cooling, the samples were removed and observed. The samples showed no change in appearance from the previous heat treatment. Samples were cut with an abrasive saw to view the bubble-size distribution throughout the piece. The bubbles were very small and good bubble-size distribution was evidenced within the pieces.

It will be appreciated that the present invention provides methods of making carbon foam which, due to pretreatment of carbon foam precursors, permits subsequent foaming at low pressure.

Whereas particular embodiments of the invention have been described herein for purposes of illustration, it will be evident to those skilled in the art that numerous variations of the details may be made without departing from the invention as set forth in the appended claims.

What is claimed is:

1. A method of making a carbon foam material comprising providing a carbon foam precursor,
heating said carbon foam precursor to remove a portion of the volatiles therefrom and create a partially devolatilized precursor extract,
effecting said heating in an inert gas environment in a sealed vessel,
cooling said devolatilized precursor extract,
converting said devolatilized extract into powder,
introducing said powder into a sealed vessel,
foaming said devolatilized precursor extract in said vessel by heating it at a pressure of less than about 20 atmospheres, and
cooling said foamed material.

2. The method of claim 1 including
effecting said foaming in an inert gas environment.

3. The method of claim 1 including
effecting said partial devolatilization under an inert gas environment.

4. The method of claim 1 including
effecting said foaming under an inert gas environment.

5. The method of claim 1 including
effecting said foaming at a pressure of about 0.5 to 1.5 atmospheres.

6. The method of claim 5 including
effecting said foaming at a temperature of about 330° C. to 600° C. for about 1 minute to 6 hours.

7. The method of claim 6 including
effecting said heating to devolatilize said carbon foam precursor to a temperature of about 100° C. to 720° C.

8. The method of claim 6 including
creating said devolatilized carbon foam precursor powder with a size of about 10 to 325 mesh.

9. The method of claim 1 including
effecting by said partial devolatilization of said carbon foam precursor alteration of the fluid nature of the matrix of said heated carbon foam precursor.

10. The method of claim 1 including
employing bituminous coal as said carbon foam precursor.

11. The method of claim 1 including
employing coal extract as said carbon foam precursor.

12. The method of claim 11 including
employing a material selected from the group consisting of de-ashed coal extract and un-ashed coal extract as said carbon foam precursor.

13. The method of claim 1 including employing mesophase pitch as said carbon foam precursor.

14. The method of claim 1 including employing petroleum based pitch as said carbon foam precursor.

15. The method of claim 1 including effecting by said partial devolatilization removal of a portion of the internal blowing agent from said carbon foam precursor.

16. The method of claim 1 including after said partial devolatilization, but before said foaming, storing said devolatilized powder.

17. The method of claim 1 including after said devolatilizing, but before said foaming, oxidizing said power.

18. The method of claim 3 including employing stagnant inert gas as said inert gas environment.

19. The method of claim 3 including employing flowing inert gas as said inert gas environment.

20. The method of claim 4 including employing stagnant inert gas as said inert gas environment.

21. The method of claim 4 including employing flowing inert gas as said inert gas environment.

22. A method of making a carbon foam material comprising providing a carbon foam precursor, creating a power of said precursor, heating said powdered carbon foam precursor at a pressure of about 0.5 to 1.5 atmospheres at a temperature of about 20° C. to 500° C. for about 1 minute to 72 hours to effect oxidation thereof, cooling said oxidized carbon foam precursor powder to room temperature, shaping said oxidized carbon foam precursor powder by placing said oxidized carbon foam precursor powder in a mold, heating said oxidized carbon foam precursor powder in said mold in an inert gas environment at a pressure less than 20 atmospheres to a temperature of about 330° C. to 600° C. to foam said powdered precursor within said mold, and cooling said foam to room temperature.

23. A method of making a carbon foam material comprising providing a carbon foam precursor, creating a powder of said precursor, heating said powdered carbon foam precursor at a pressure of about 0.5 to 1.5 atmospheres at a temperature of about 20° C. to 500° C. for about 1 minute to 72 hours to effect oxidation thereof, heating said oxidized carbon foam precursor in an inert gas environment at a pressure less than 20 atmospheres to a temperature of about 330° C. to 600° C. to foam said powdered precursor, cooling said foam to room temperature, and employing bituminous coal as said carbon foam precursor.

24. The method of claim 22 including employing coal extract as said carbon foam precursor.

25. The method of claim 22 including employing a material selected from the group consisting of de-ashed coal extract and un-ashed coal extract as said carbon foam precursor.

26. The method of claim 22 including employing hydrogenated coal extract as said carbon foam precursor.

27. The method of claim 22 including employing mesophase pitch as said carbon foam precursor.

28. The method of claim 22 including employing petroleum based pitch as said carbon foam precursor.

29. The method of claim 22 including effecting said carbon foam precursor oxidation in the presence of at least one material selected from the group consisting of water and steam.

30. The method of claim 22 including devolatilizing said precursor prior to said oxidation.

31. The method of claim 22 including creating said precursor powder in the range of about 10 to 325 mesh.

32. A method of making a carbon foam material comprising providing a carbon foam precursor, creating a powder of said precursor, heating said powdered carbon foam precursor at a pressure of about 0.5 to 1.5 atmospheres at a temperature of about 20° C. to 500° C. for about 1 minute to 72 hours to effect oxidation thereof, heating said oxidized carbon foam precursor in an inert gas environment at a pressure less than 20 atmospheres to a temperature of about 330° C. to 600° C. to foam said powdered precursor, cooling said foam to room temperature, and after said oxidation, but prior to said foaming, storing said oxidized precursor.

33. The method of claim 22 including effecting said foaming at a pressure of about 0.5 to 1.5 atmospheres.

* * * * *

UNITED STATES PATENT AND TRADEMARK OFFICE
CERTIFICATE OF CORRECTION

PATENT NO. : 6,797,251 B1
DATED : September 28, 2004
INVENTOR(S) : Barbara Bennett et al.

It is certified that error appears in the above-identified patent and that said Letters Patent is hereby corrected as shown below:

Column 6,
Line 29, after "into" insert -- a --.

Column 7,
Line 33, "power" should read -- powder --.

Signed and Sealed this

Third Day of May, 2005

JON W. DUDAS
*Director of the United States Patent and Trademark Office*

UNITED STATES PATENT AND TRADEMARK OFFICE
CERTIFICATE OF CORRECTION

| | |
|---|---|
| PATENT NO. | : 6,797,251 B1 |
| APPLICATION NO. | : 10/004781 |
| DATED | : September 28, 2004 |
| INVENTOR(S) | : Barbara Bennett and Alfred Stiller |

Page 1 of 1

It is certified that error appears in the above-identified patent and that said Letters Patent is hereby corrected as shown below:

Column 1, before line 5 and after "METHOD OF MAKING CARBON FOAM AT LOW PRESSURE," insert the following:

--This invention was made with Government support under DOE grant number DE-FC26-02NT41596 awarded by DOE. The Government has certain rights in this invention.--

Signed and Sealed this

Twenty-fourth Day of November, 2009

David J. Kappos
*Director of the United States Patent and Trademark Office*